US011841884B2

(12) United States Patent
Ship et al.

(10) Patent No.: US 11,841,884 B2
(45) Date of Patent: Dec. 12, 2023

(54) METHOD TO GUIDED CONTRACT DRAFTING USING AN INTERACTIVE CHATBOT

(71) Applicant: Creative Intell, Inc., New York, NY (US)

(72) Inventors: Steven Ship, New York, NY (US); David Fritz, New York, NY (US)

(73) Assignee: Creative Intell, Inc., New York, NY (US)

( * ) Notice: Subject to any disclaimer, the term of this patent is extended or adjusted under 35 U.S.C. 154(b) by 0 days.

(21) Appl. No.: 17/510,312

(22) Filed: Oct. 25, 2021

(65) Prior Publication Data
US 2022/0229860 A1    Jul. 21, 2022

Related U.S. Application Data

(60) Provisional application No. 63/138,119, filed on Jan. 15, 2021.

(51) Int. Cl.
*G06F 16/33* (2019.01)
*G06F 16/332* (2019.01)
(Continued)

(52) U.S. Cl.
CPC ........ *G06F 16/3329* (2019.01); *G06F 3/0486* (2013.01); *G06F 16/3323* (2019.01);
(Continued)

(58) Field of Classification Search
CPC ............. G06F 16/90332; G06F 40/174; G06F 40/186; G06F 16/3329; G06F 16/358; G06F 16/3323; G06F 3/0486; H04L 51/02

See application file for complete search history.

(56) References Cited

U.S. PATENT DOCUMENTS 10,445,698 B2 * 10/2019 Hunn ..................... G06Q 10/10
10,607,298 B1 * 3/2020 Hanekamp, Jr. ..... G06Q 40/123
(Continued)

FOREIGN PATENT DOCUMENTS

WO   WO-2015077897 A1 *  6/2015  ........... G06F 17/248
WO   WO 2017/083346         5/2017
(Continued)

OTHER PUBLICATIONS

Scott Matteson, "10 ways Alexa can help you get work done", publisher: TechRepublic, pp. 1-10, published: Sep. 15, 2017. (Year: 2017).*

(Continued)

*Primary Examiner* — Wilson W Tsui
(74) *Attorney, Agent, or Firm* — Polsinelli LLP

(57) ABSTRACT

A method of guided collaborative digital contract drafting and negotiations using a chatbot and/or virtual assistant to guide a user through developing a digital contract. The chatbot provides a user with an interactive guided process through a collaborative digital contract drafting process by allowing a natural language interaction. The chatbot can provide education to the user, explain the process and different portions of the digital contract, and offer suggestions for substitute clauses. Furthermore, the user can interact with the chatbot to navigate through the process as well. Additionally, depending on the industry and the purpose of the digital contract, the chatbot can suggest other parties to involve and coordinate communications.

21 Claims, 7 Drawing Sheets

(51) Int. Cl.
*G06F 16/35* (2019.01)
*H04L 51/02* (2022.01)
*G06F 40/186* (2020.01)
*G06F 3/0486* (2013.01)

(52) U.S. Cl.
CPC .......... *G06F 16/358* (2019.01); *G06F 40/186* (2020.01); *H04L 51/02* (2013.01)

(56) References Cited

U.S. PATENT DOCUMENTS

| | | |
|---|---|---|
| 2002/0129056 A1 | 9/2002 | Conant et al. |
| 2007/0078672 A1* | 4/2007 | Lee .................. G06Q 50/18 705/311 |
| 2008/0022107 A1* | 1/2008 | Pickles ............ G06F 40/117 713/176 |
| 2008/0147531 A1* | 6/2008 | Holly ............... G06Q 40/02 705/1.1 |
| 2011/0296191 A1 | 12/2011 | Mouille |
| 2011/0314371 A1* | 12/2011 | Peterson ......... G06F 40/186 715/234 |
| 2012/0179647 A1* | 7/2012 | Crucs ............... G06F 40/166 707/E17.008 |
| 2014/0047330 A1 | 2/2014 | Yan |
| 2014/0123057 A1* | 5/2014 | Eigner ............. G06F 21/60 715/780 |
| 2014/0149374 A1 | 5/2014 | Duran et al. |
| 2014/0164255 A1 | 6/2014 | Daly et al. |
| 2016/0012556 A1 | 1/2016 | Moore et al. |
| 2017/0364374 A1* | 12/2017 | Maiden ............ G06F 9/453 |
| 2019/0215283 A1* | 7/2019 | Nahum ............ H04L 63/0823 |
| 2019/0354933 A1* | 11/2019 | Joanni ............. G06F 40/186 |
| 2019/0377779 A1* | 12/2019 | Gelosi ............. G06F 40/137 |
| 2020/0184584 A1 | 6/2020 | Farivar et al. |
| 2020/0311688 A1* | 10/2020 | Lipman ........... G06Q 10/1053 |
| 2020/0364813 A1* | 11/2020 | Turgman ......... G06Q 50/188 |
| 2020/0394734 A1* | 12/2020 | Moriarty ......... G06Q 50/184 |
| 2021/0027286 A1 | 1/2021 | Strashnoy |
| 2021/0201013 A1* | 7/2021 | Makhija .......... G06V 30/414 |
| 2021/0209708 A1* | 7/2021 | Admon ............ G06F 16/93 |
| 2021/0224937 A1* | 7/2021 | Luna ............... G06F 40/58 |
| 2021/0398136 A1* | 12/2021 | Cebertowicz .... G06Q 30/01 |
| 2022/0036424 A1* | 2/2022 | Almeida .......... G06Q 30/0635 |
| 2022/0229978 A1 | 7/2022 | Ship |

FOREIGN PATENT DOCUMENTS

| | | |
|---|---|---|
| WO | WO 2022/154845 | 7/2022 |
| WO | WO 2022/154846 | 7/2022 |

OTHER PUBLICATIONS

PCT/US21/56521, Method of Guided Contract Drafting Using an Interactive Chatbot and Virtual Assistant, Oct. 25, 2021.
U.S. Appl. No. 17/510,335, Steven Ship System for Collaboration on the Drafting of a Shared Digital Contract, Oct. 25, 2021.
PCT/US21/56522, System for Collaboration on the Drafting of a Shared Digital Contract, Oct. 25, 2021.
Betts et al., "The Dawn of Fully Automated Contract Drafting: Machine Learning Breathes New Life Into a Decades-Old Promise", 5 Duke Law & Technology Review 216-233 (2017). Retrieved Dec. 20, 2021. Retrieved from <URL: https://scholarship.law.duke.edu/dltr/vol15/iss1/11/>.
Liddicoat et al. "Beyond the hype AI and the law: an update", Future of Law, 2019. Retrieved on Dec. 20, 2021. Retrieved from <URL: http://www.cs.otago.ac.nz/research/ai/AI-Law/Beyondthehype.pdf>>.
PCT Application No. PCT/US2021/056521 International Search Report and Written Opinion dated Jan. 24, 2022.
PCT Application No. PCT/US2021/056522 International Search Report and Written Opinion dated Jan. 26, 2022.
U.S. Appl. No. 17/510,335 Office Action dated Feb. 3, 2022.

* cited by examiner

METHOD TO GUIDED CONTRACT DRAFTING USING AN INTERACTIVE CHATBOT

CROSS-REFERENCE TO RELATED APPLICATIONS

This application claims the benefit of, and priority to, U.S. Provisional Patent Application No. 63/138,119, filed on Jan. 15, 2021, entitled "Method of Guided Contract Development Using an Interactive Chatbot and Virtual Assistant," the contents of which are incorporated herein by reference in their entirety.

FIELD OF THE DISCLOSURE

The present disclosure is generally related to a collaborative digital contract drafting and management system. More specifically, the collaborative digital contract drafting and management system may guide users through a collaborative digital contract drafting and negotiation process using a chatbot that uses a natural language engine.

BACKGROUND

A collaborative digital contract drafting process and negotiation can be very complicated and depending on the industry it could include several parties that need to collaborate, communicate, and negotiate the terms of the digital contract. Digital contract negotiation is a discussion that multiple parties undertake in an effort to reach a resolution.

Furthermore, many contract software products on the market are designed for multiple and general industries and rely on static or industry standard contract templates with only a few dynamic fields. Furthermore, there is a lot of time wasted and frustration in developing contracts due to version control on digital document drafting software.

A chatbot is a software application used to conduct an online or internet-based chat conversation via text, text-to-speech, and virtual assistants in place of using direct contact with a live human agent. Chatbots and virtual assistants are designed to simulate the way a human would behave as a conversational partner. Chatbot systems typically require continuous training and testing and are improved over time. Chatbots and virtual assistants are today state of the art and are becoming more and more useful. A chatbot, virtual assistant, and voice assistant for contract management would help simplify a complicated contract process by making it easier to navigate the process and by providing feedback and education. A chatbot is also referred to as a program that automates conversations on the web or instant messages. A virtual assistant can carry out tasks or services for an individual based on commands or questions.

DESCRIPTIONS OF THE DRAWINGS

DETAILED DESCRIPTION

The present disclosure is generally related to a contract drafting and management system. Specifically, the collaborative digital contract drafting and management system guides users through a contract drafting and negotiation process using a chatbot that uses a natural language engine. The present disclosure may use a contract drafting and management system in the music and entertainment industries, but it should be obvious to those skilled in the art that the present invention is not limited to these fields.

Embodiments of the present disclosure will be described more fully hereinafter with reference to the accompanying drawings in which like numerals represent like elements throughout the several figures, and in which example embodiments are shown. Embodiments of the claims may, however, may be embodied in many different forms and should not be construed as limited to the embodiments set forth herein. The examples set forth herein are non-limiting examples and are merely examples among other possible examples.

Figure 1:
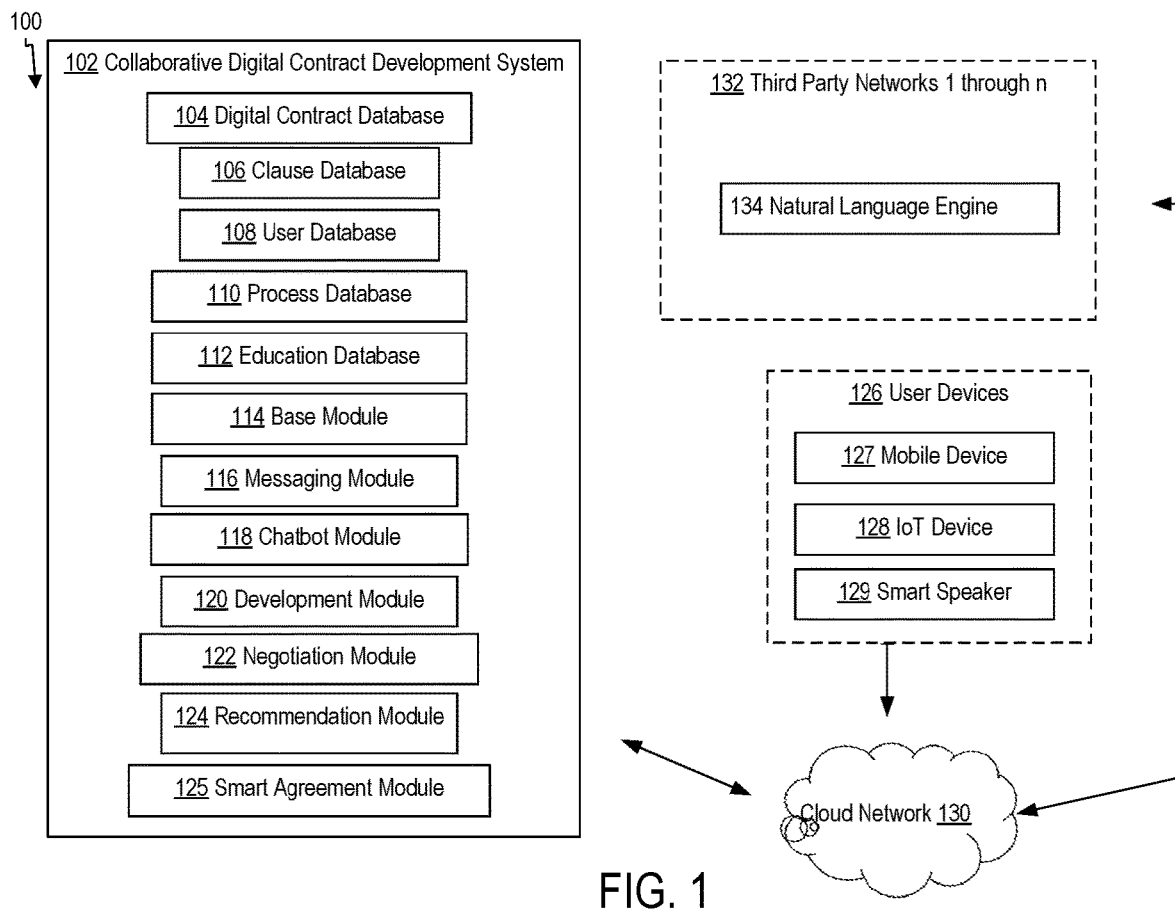
FIG. 1 illustrates an example collaborative digital contract drafting system, according to an embodiment.

FIG. 1 illustrates an example collaborative digital contract drafting environment 100. The collaborative digital contract drafting environment 100 may include a collaborative digital contract drafting system 102 that assists uses with developing, negotiating, and collaborating on collaborative digital contract drafting by using, for example, a chatbot or virtual assistant which may serve as a conversational means for facilitating the digital contractual process between one or more users and the collaborative digital contract drafting system 102.

For example, a chatbot module 118 controlling a chatbot or virtual assistant may help a user through a collaborative digital contract drafting process by asking questions to help populate terms and clauses of the digital contract by helping select the right content or clause (which are known in the collaborative digital contract drafting system as best-in-class content or clauses), and receiving natural language commands for editing and negotiation terms and clauses. The chatbot can also provide education to the user about different sections or components of a contract. Furthermore, the chatbot may help ensure that parties are contacted and involved during the negotiation phase. Specifically, the chatbot can serve as a virtual assistant in setting up any needed tasks for parties or just guiding a user through the negotiation process.

The collaborative digital contract drafting system 102 may also keep track of changes and versions, and further minimize wasted time and frustrations of its users by providing educational material regarding subject matter in the digital contracts as well as keeping records of track changes. A contract database 104 may store templates of contracts for a specific industry. The templates that are stored in the digital contract database 104 may be standard contracts that are often used in an industry or may be custom templates created and stored by a user. For example, in many industries there is often a standard format for contracts that have been adopted and used across the industry. Furthermore, the language of the similar contracts in an industry are often remarkably similar and even more importantly, tried and true language, which would be best used. In some instances, users may have a custom contract that they might use. In such cases, the user can save and store (and then reuse) their custom contracts.

When a contract is stored in the digital contract database 104, the different clauses of the digital contract are marked and identified. This is to allow easy identification of each clauses and replacement of clauses during the collaborative digital contract drafting process. For example, a contract may have the following clauses identified: preamble, definitions, action section, reps & warranties, covenant and rights, conditions to obligations, end game provisions & remedies, general provisions, and signatures. Additionally, in some industries, there are many different types of contracts, such as ownership rights contracts or performance at an event contract, etc. Contracts can further be categorized and organized within the digital contracts database 104 based on their use case.

The collaborative digital contract drafting system 102 may include a clause database 106 that stores possible clauses or language for different sections of a contract. The clause database 106 may be used to customize a standard contract with language that better suits the user's needs. The clause database 106 may contain standard clauses often used in an industry but would also store custom or alternative clauses for different purposes or use cases.

The collaborative digital contract drafting system 102 may further include a user database 108 that stores user data including basic contact information, general profile information, and current and past activity. Current and past activity may include current and past contracts that have been developed or entered. In one embodiment, current and past activity can be used to facilitate future contracts. By using previous user contracts, the system can autofill certain common fields such as certain parties to be involved and automatically use previous clauses the user has used when developing and customizing a contract. The collaborative digital contract drafting system 102 may track clauses used by parties in prior contracts. Autofill is a function in some computer applications or programs, typically those containing forms, which prefills in a field automatically and save hours of time. As such, the user database 108 would greatly improve the accuracy and speed of the collaborative digital contract drafting process.

In another embodiment of the user database 108, the user database 108 may store contact information on parties and may further certify the users. For example, the user database 108 may create a Passport ID that a user may use to send contracting information to other parties and then populates the digital contract with the accurate contracting party information. A process database 110 may store the standard steps a user might take during a contract drafting and negotiation process, including but not limited to, the typical steps of the digital contract process, the questions one might ask a user to obtain the proper information at each step, etc. The process database 110 may contain information that the chatbot could use to help facilitate the digital contract process.

The chatbot module 118 may use the process database 110 and the user database 108 in conjunction to guide and navigate the digital contract process. Furthermore, workflows may be stored in the process database 110 and the workflows may be dynamic and customizable workflows that can adapt to various scenarios. For example, contract processes or workflows may vary from user to user and from industry to industry. A user would then be able to customize the workflow for their industry if there is not already a preprogrammed workflow.

The collaborative digital contract drafting system 102 may further include an education database 112 that stores bits of education and explanation that can be called upon when a user does not understand something. It could be as simple as a providing the user with a definition or explanation of a specific term in the digital contract. The education database 112 may further store little clips for educating a user, a series of slides, or even link to other resources. In some instances, the education database 112 may be used to populate pop-ups with term definitions when a user hovers over a specific term or word. A chatbot module 118 can also access the educational content from the education database 112 when a user asks a question, or automatically suggest certain educational materials for new users throughout the digital contract process even if the user does not request it.

The collaborative digital contract drafting system 102 may further include a base module 114. The base module 114 may be the main module that is initiated when a user initiates the collaborative digital contract drafting system 102. The base module 114 may control and initiate the other modules or processes within the collaborative digital contract drafting system 102. For example, when the user initiates the collaborative digital contract drafting system 102 to begin a new contract, the base module 114 may initiate a drafting module 120 and a chatbot module 118 to being guiding the user through the collaborative digital contract drafting process.

The collaborative digital contract drafting system 102 may further include a messaging module 116 that is initiated by the base module 114 in the instance that a user is initiating the collaborative digital contract drafting system 102 via a Short Message Service (SMS) on a user mobile device 128. The messaging module 116 is not limited to a SMS protocol but is one example of communication to devices outside the platform. For example, the messaging module 116 could be used to convert communications from the platform to other protocols such as STOMP, MQTT, SMS, AMQP, HTTP, and WebSocket. Furthermore, the chatbot module 118 and the messaging module 116 would be compatible with other messaging platforms already on the market such as, but not limited to, WhatsApp, Apple iMessage, Facebook Messenger, Slack, and MS teams. In addition, the chatbot module 118 and the messaging module 116 may be compatible and/or include voice-activated, voice recognition, and other voice technologies.

In another embodiment, the messaging module 116 and chatbot module 118 may be used with voice commands, virtual assistants, or smart speakers, allowing a user to communicate with the chatbot using their voice rather than typing. The messaging module 116 would be used to convert and pass communications to external devices or platforms. The messaging module 116 may serve as a pass through for the chatbot module 118. The messaging module 116 may convert the chatbot and user conversation into an SMS format and remove any need for visualizations visible on a user device 126, such as a computer or tablet, but not the user mobile device 128.

The chatbot module 118 may be the main process within the collaborative digital contract drafting system 102 that is used to control most of the process of developing and negotiating a contract. The chatbot module 118 may leverage the other modules and databases in the collaborative digital contract drafting system 102 to provide a natural conversational experience that guides a user through the digital contract process.

A user may initiate the collaborative digital contract drafting system 102 and cause the base module 114 to initiate the chatbot module 118. The base module 114 may determine if the user is using SMS. If the user is using SMS, the base module 114 initiates the messaging module 116. If not, the base module 114 prompt the user, via the chatbot module 118, for whether the user is creating a new contract or picking up where they left off on a saved active contract. The base module 114 may receive input indicating whether the user is creating a contract or revisiting a saved active contract. If the user is creating a new contract, the base module 114 may initiate a drafting module 120.

If the user is revisiting a saved draft contract, the base module 114 may prompt the user, via the chatbot module 118, for which saved draft contract to continue with and poll the user database 108 for contract data. The process database 110 may then be used to provide information to the digital contract process. Depending at which point in the process the digital contract is in, the drafting module 120 or negotiation module 122 may coordinate with the chatbot module 118. Furthermore, the chatbot module 118 may use a natural language processing engines that be used to understand what the user is inputting during the conversation. Natural language processing (NLP) is a subfield of linguistics, computer science, and artificial intelligence that deals with the interactions between computers and human language, in particular how to program computers to process and analyze large amounts of natural language data. The natural language or natural language processing is a form of artificial intelligence that gives computers the ability to read, understand, and interpret human language. Natural language processing allows computers to measure sentiment and determine which parts of human language are important. For computers, this is an extremely difficult thing to do because of the large amount of unstructured data, the lack of formal rules, and the absence of real-world context or intent. There are already many natural language engines in the market and are well known in the art.

The natural language engine 134 may be housed within the collaborative digital contract drafting system 102, or the collaborative digital contract drafting system 102 and chatbot module 118 could leverage one or more third-party natural language engines through one or more third-party networks 132, that are trained to understand legal language, terms, and industry-specific terminology. Natural language engines are well known in the industry and are known in the art with respect to connecting through APIs (Application Program Interfaces), such as with the chatbot module 118 in this case.

In another embodiment, the chatbot module 118 may include a learning component that can learn a user's intent or next possible action using artificial intelligence. For example, the chatbot module 118 may store communications from users and use the stored communications to make connection with the digital contract process and provide comment regarding next steps. The drafting module 120 may be used by the chatbot module 118 and help guide the digital contract process by polling the process database 110, determining the different sections in the digital contract, and inputting data from the user into the digital contract sections or fields. For example, if a user is starting a new contract, the drafting module 120 may be initiated by the base module 114, and the drafting module 120 may then start to receive, from the chatbot module 118, inputs from the user. The drafting module 120 may also receive the current step or process, so it knows where to input the data. Drafting module 120 can also be used to determine if there are any sections or fields of the digital contract that are missing or not filled in.

The negotiation module 122 is like the drafting module 120 but controls the negotiation process. The negotiation module 122 is initiated by the base module 114 when the user had completed the drafting stage of the digital contract process. The negotiation module 122 may help coordinate parties and send copies of the digital contract to each user, including tracking changes that users might make. The recommendation module 124 may be used to recommend specific pieces of information throughout the collaborative digital contract drafting. For example, the recommendation module 124 may suggest specific clauses based on the clauses that someone else has used. Furthermore, the recommendation module 124 might suggest additional or other parties that the user may have forgotten or other associated contracts the user might need to develop and might have overlooked.

A smart agreement module 125 may convert the digital contract into a smart agreement that is managed by blockchain technology for transactions covered by the agreement to be enforced whereby terms of agreement are carried out automatically or at least various parameters are tracked and stored in the blockchain. The smart agreement module 125 may further provide one or more application program interfaces (APIs) and/or plug-ins that correspond directly with properties and methods of the smart agreement. For example, the APIs may be provided to NFT-related entities wherein the smart agreement may comprise copyright law elements. As another example, in a music licensing context, once there is a digital contract, converting the digital contract into a smart agreement and then providing an API that recognizes and tracks instances that establish terms of the digital contract has been met and corresponds with the smart agreement to establish the royalties to be paid and/or cause to transaction between the parties upon reaching a certain threshold, for example.

The user device 126 may be comprised of a tablet or computer or in some cases even a smartphone. The user device 126 needs the capability for the user to be able to interact with both the chatbot and see the digital contract or interact with the digital contract on a screen or display. The user mobile device 128 may be a smartphone or mobile device that the user would use to interact with the system, such as using a SMS protocol or via a web-based message, through a messaging module 116 and the chatbot module 118. The user mobile device 128 does not require the use of a display to see the actual contract, just the user of an SMS system to communicate with the collaborative digital contract drafting system 102.

The cloud network 130 may be a type of information technology (IT) infrastructure in which some or all of an organization's network capabilities and resources are hosted in a public or private cloud platform, managed in-house or by a service provider, and available on demand. A cloud network 130 may also be referred to as a distributed network. Third-party software can be accessed as a server through APIs or other means through the cloud network 130. One or more third-party networks 132 may be connected to the cloud network allowing access to third party resources and software, such as a natural language engine, machine learning, and or artificial intelligence.

Functioning of the digital contract Database 104 will now be explained with reference to Table 1 below.

TABLE 1

Contract Database

| Contract Description | Description | File/Data | Metadata |
|---|---|---|---|
| Contract A | Industry A Standard Contract | ContractAA.dat | ContractAA.meta |
| Contract B | Industry A Standard Contract | ContractAB.dat | ContractAB.meta |
| Contract C | Industry A Standard Contract | ContractAC.dat | ContractAC.meta |
| Contract A | Industry B Standard Contract | ContractBA.dat | ContractBA.meta |
| Contract B | Industry B Standard Contract | ContractBB.dat | ContractBB.meta |
| Contract C | Industry B Standard Contract | ContractBC.dat | ContractBC.meta |

The digital contract database 104 may contain templates of contracts for a specific industry. The templates that are stored in the digital contract database 104 may be standard contracts that are often used in an industry or may be custom templates created and stored by a user. For example, in many industries there is often a standard format for contracts that have been adopted and used across the industry. Furthermore, the language of the digital contracts is often very similar. In some instances, users may have a custom contract that they might use, in which case, the user would save and store custom contracts in the digital contract database 104.

When a contract is stored in the digital contract database 104, the different sections of the digital contract are marked and identified. This is to allow easy identification of each section and replacement of sections during the collaborative digital contract drafting process. For example, a contract may have the following sections identified: preamble, definitions, action section, reps & warranties, covenant and rights, conditions to obligations, end game provisions & remedies, general provisions, and signatures. Additionally, in some industries there are many different types of contracts. Contracts can further be categorized and organized within the database based on their use case. The digital contract data could be stored as a parsed file in the database where each section is parsed out into its own field. Alternatively, the digital contract data could be stored as a file with meta data that would determine where each section or field was located within the digital contract. Each contract would be its own file with embedded metadata.

Functioning of the clause database 106 will now be explained with reference to Table 2 below.

TABLE 2

Clause Database

| Clause Description | Clause Section | File/Data | Metadata |
|---|---|---|---|
| Clause A | Preamble | ClauseA.dat | ClauseA.meta |
| Clause B | Preamble | ClauseB.dat | ClauseB.meta |
| Clause C | Preamble | ClauseC.dat | ClauseC.meta |
| Clause D | Definitions | ClauseD.dat | ClauseD.meta |
| Clause E | Action | ClauseE.dat | ClauseE.meta |
| Clause F | Conditions | ClauseF.dat | ClauseF.meta |

The clause database 106 may contain possible clauses or language for different sections of a contract. The clause database 106 is used to customize standard contract with language that better suits the user's needs. The clause database 106 may contain standard clauses often used in an industry but would also store custom or alternative and variations of clauses for different purposes or use cases. Clauses may be organized or categorized based on the section of the digital contract and can also include other tags or categorizations based on use cases or other tags assigned by a user (i.e., client specific clauses). Data may be stored in the database in a tabulated database or by files with associated metadata.

Functioning of the user database 108 will be explained with reference to Table 3 below.

TABLE 3

User Database

| User ID | Name | Username | Email | Address | User Type | Contract Data |
|---|---|---|---|---|---|---|
| 0001 | John Smith | Jsmith | smith@email.com | 8 Main St., Lincoln, NC | Contractee | ContractJS001.dat ContractJS002.dat ContractJS003.dat |
| 0002 | Bob Johnson | Bjohnson | Bjohnson2@email.com | 33 Swift St., Charlotte, NH | Attorney | ContractBJ001.dat |
| 0003 | Stacey Beckham | Sbeckham | sbeckham@email.com | 4 East St., Albany, NY | Contractor | ContractJS001.dat ContractJS002.dat ContractJS003.dat |
| 0004 | Christina Thomas | Cthomas | cthomas@email.com | 6 West St., Potsdam NY | Contractor | ContractCT001.dat |

The user database 108 may contain user data including basic contact information, general profile information, and current and past activity. Current and past activity may include current and past contracts that have been developed or entered. In one embodiment, current and past activity can be used to facilitate future contracts. By leveraging previous user contracts, the collaborative digital contract drafting system 102 can autofill certain common fields such as certain parties to be involved, and automatically use previous clauses the user has used when developing and customizing a contract. This would greatly improve the accuracy and speed of the collaborative digital contract drafting process. User profile information may be stored in a table. A user's current and past activity is stored in a table but also linked to the files that are associated with each activity. The files would contain contract data that is either in progress or completed.

Functioning of the process database 110 will now be explained with reference to Table 4 below.

TABLE 4

Process Database

| Step Number | Step Title | Phase | Chatbot data |
|---|---|---|---|
| 1 | Additional Parties | DraftingDrafting | AdditionalParties.dat |
| 2 | Preamble 1 | DraftingDrafting | Preamble1.dat |
| 3 | Preamble 2 | DraftingDrafting | Preamble2.dat |
| 4 | Preamble 3 | DraftingDrafting | Preamble3.dat |
| 5 | Definitions | DraftingDrafting | Definitions.dat |
| 6 | Conditions 1 | DraftingDrafting | Conditions1.dat |
| 7 | Conditions 2 | DraftingDrafting | Conditions2.dat |
| ... | ... | ... | ... |
| 1 | Contact All Parties | Negotiation | ContactAll.dat |
| 2 | Send Contract | Negotiation | Sendcontract.dat |
| 3 | Receive Edits | Negotiation | Receiveedits.dat |
| 4 | Send Revisions | Negotiation | Sendrevisions.dat |
| ... | ... | ... | ... |
| 15 | Execute-Signatures | Approval | Execute.dat |

The process database 110 may contain the standard steps a user might take during a contract drafting and negotiation process, including but not limited to, the typical steps of the digital contract process, the questions one might asked a user to obtain the proper information at each step, etc. The process database 110 may contain information that the chatbot module 118 could use to help facilitate the digital contract process (i.e., questions to ask the user). The chatbot module 118 will use the process database 110 and the user database 108 in conjunction to guide and navigate the digital contract process. The data in the process database 110 may be stored in tables or as files with associated metadata. In another embodiment of the process database 110, data would be contained within, providing trained logic between the chatbot's natural language processing and data within the data. Specifically, the trained logic would allow the chatbot to identify and select specific data to suggest to the user, such as specific clauses.

Functioning of the education database 112 will now be explained with reference to FIG. 6 below.

| Topic | Definition | Files | Videos | Links |
|---|---|---|---|---|
| Preamble | Preambledefinitions.dat | Preambleexplained.ppt | Preamble.vid | www.wiki.com/preamble |
| Terms & conditions | Termsandconditions.dat | n/a | n/a<br>mailto:Bjohnson2@email.com | www.contractsdefine.com |
| Parties defined | Parties.dat | Partiesexplained.pdf | Parties.vid<br>mailto:sbeckham@email.com | n/a |

The education database 112 may contain bits of education and explanation that can be called up when a user does not understand something. It could be providing the user with a definition or explanation of a specific term in the digital contract or providing the user with definitions set forth by other parties. The database may further store little clips for educating a user (i.e., videos, graphics, or animations), a series of slides, or even links to other resources. In some instances, the education database may be used to populate pop-ups with term definitions when a user hovers over a specific term or word. The chatbot module 118 can also access the educational content when a user asks a question or automatically suggest certain educational materials for new users throughout the digital contract process even if the user does not request it.

Figure 2A:
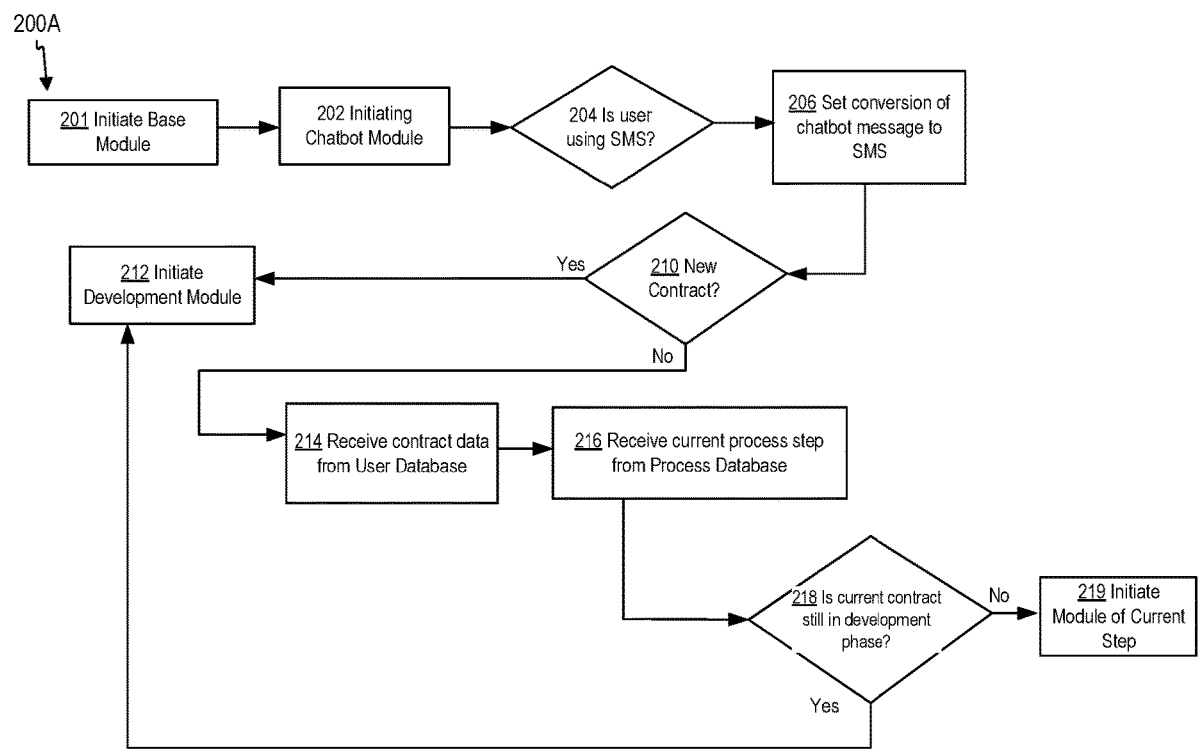
FIG. 2A illustrates an example workflow performed by a collaboration between a base module, a chatbot module, and a drafting module, according to an embodiment.

FIG. 2A illustrates an example workflow 200A performed by the base module 114, in coordination with the chatbot module 118, the messaging module 116, and the drafting module 120, according to an embodiment. The example workflow 200 may begin with the user initiating the base module 114 from a user device 126, which may be a user mobile device 128, an Internet of Things (IoT) device 128, and/or a smart speaker 129, at step 201. The chatbot module 118 may then initiated by the base module 114, at step 202. The base module 114 may then determine if the user is initiating the base module 114 through a messaging service or if the user is initiating the system through a web application, at step 204. If the user is initiating the base module 114 using SMS protocols, the messaging module 116 may set to convert chatbot messages into an SMS format, at step 206.

For example, the messaging module 116 being initiated by the base module 114 if the user is communicating with the system through the mobile device 127. The messaging module 116 may then receive SMS messages from the mobile device 127. In another embodiment, the chatbot module 118 may send the user an SMS message first. The user message may be converted and sent to the chatbot module 118. Because SMS messages are not the same as normal communications in line with a web-based application of system, the messaging module 116 may act as a passthrough converting and only sending relevant data.

Once the user message is sent to the chatbot module 118, a response from the chatbot module 118 may be sent to the messaging module 116. Again, the web-based message must be converted so that it can be sent to the user. The message from the chatbot module 118 may then be converted to an SMS format. As mentioned above, this is needed as the protocols for each differ. Furthermore, not all the data that a chatbot module 118 can provide can be sent over SMS so the messaging module 116 may need to convert the data. Methods of converting web-based communications to SMS are well known in the art. Once the message from the chatbot module 118 has been converted, it is sent to the user via the SMS protocol.

It is then determined if either or both the user and the chatbot module 118 are still actively communicating. If the user is no longer communicating, the module can end as there is no longer a need to for the messaging module 116. If the user is still active, the messaging module 116 may then check to see if the user has come to a point in the process where they have done everything they can via SMS message. There is only so much data that can be entered and communicated over SMS messages. At some point in the collaborative digital contract drafting process, the user will need a visual display to edit and provide inputs to the collaborative digital contract drafting system 102. If the user has reached that point, the messaging module 116 ends. If not, the messaging module 116 may continue converting messages between the user and the chatbot module 118. Once there are no longer any more communications or the user has hit a point in the process that has reached the limits of SMS, the messaging module 116 may end.

As mentioned previously the messaging module 116 may not limited to the SMS protocol but is one example of communication to devices outside the platform. For example, the messaging module 116 could be used to convert communications from the platform to other protocols such as STOMP, MQTT, SMS, AMQP, HTTP and WebSocket. Furthermore, the chatbot module 118 and the messaging module 116 may be compatible with other messaging platforms already on the market such as, but not limited to, WhatsApp, Apple iMessage, Facebook Messenger, Slack, Telegram, and MS teams. In another embodiment, the messaging module 116 and chatbot module 118 may be used with voice commands, virtual assistants, or smart speakers, allowing a user to communicate with the chatbot using their voice rather than typing. The messaging module 116 would be used to convert and pass communications to external devices or platforms.

Next, the chatbot module 118 may query whether the user intends to develop a new contract or revisiting to a saved draft contract, at step 210. If the user notifies the chatbot module 118 that they are developing a new contract, the base module 114 may initiate the drafting module 120 from an initial stage of the collaborative digital contract drafting process and the chatbot module 118 would receive the initial steps and prompts from the process database 110, at step 212. If the user notifies the chatbot module 118 that they wish to revisit a saved draft contract, the user database 108 may be polled for the digital contract data that the user would like to continue developing. The digital contract data may then be sent to the chatbot module 118 and/or the drafting module 120, at step 214.

The chatbot module 118 may receive the digital contract data from the base module 114, and the digital contract data that is received may notify the chatbot module 118 what data has been collected and entered into the digital contract so far. A corresponding next process step may be polled from the process database 110 and sent to the chatbot module 118 and/or the drafting module 120 so that the so that the collaborative digital contract drafting process can pick up where it was left off and chatbot module 118 would receive a correct prompt to send to the user for the next steps in the collaborative digital contract drafting process, at step 216. The base module 114 may determine whether the digital contract is still in drafting phase, in step 218. If the digital contract is not in the drafting phase, the base module 114 may initiate a module for which a current step is associated with, in step 219. If the digital contract is still in the drafting phase, the chatbot module 118 may continue to receive process steps, prompts, messages, communications, or questions from the drafting module 120 and continues to send user responses and data to the drafting module 120, in step 212.

Figure 2B:
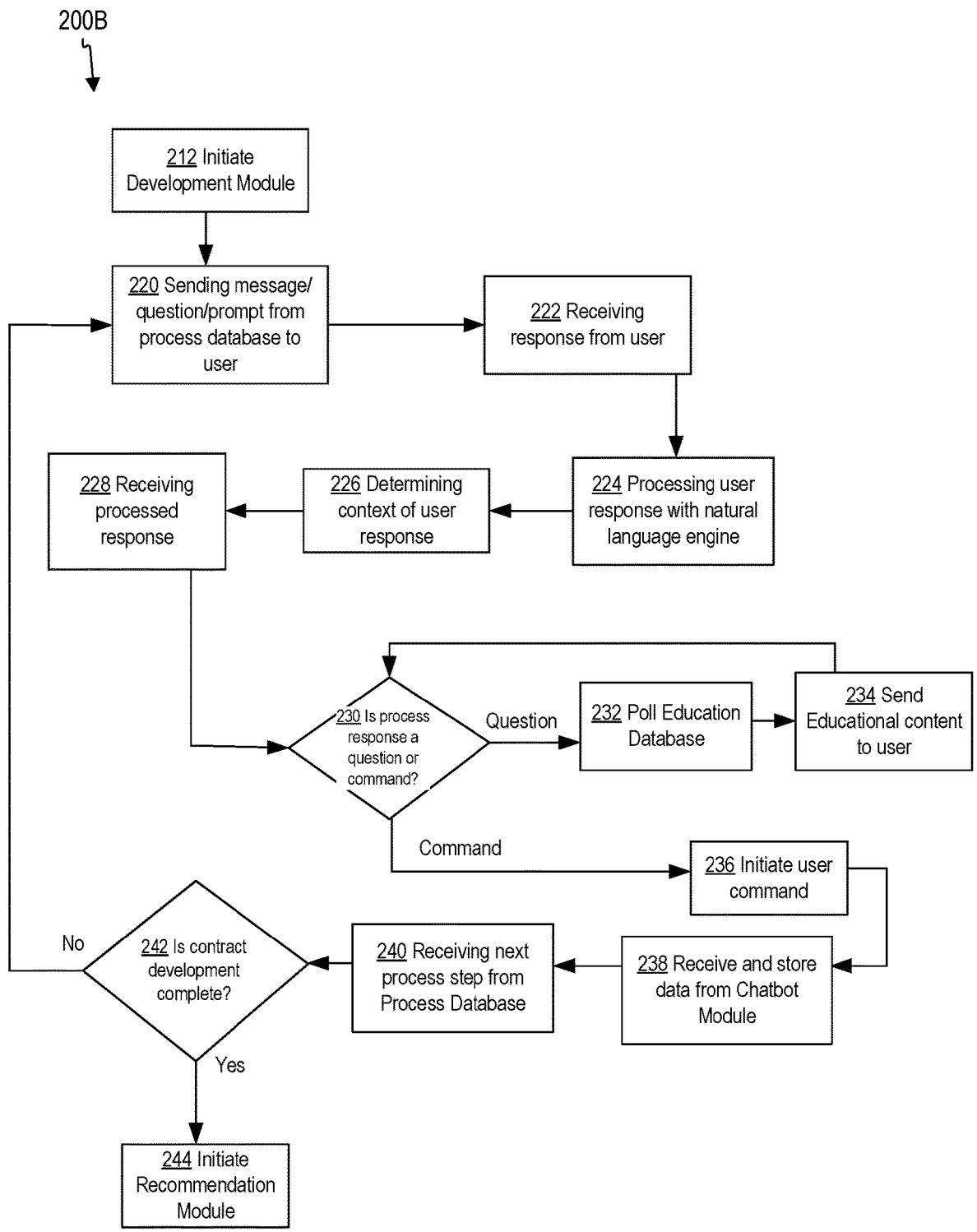
FIG. 2B illustrates an example workflow performed by a drafting module, according to an embodiment.

FIG. 2B illustrates an example workflow 200B performed by the drafting module 120, according to an embodiment. The example workflow 200B begins with initiated the drafting module 120, at step 212, which may continue from the example workflow 200A of FIG. 2A. The message may be sent dependent on the step and data received from the process database 110 and base module 114, in step 220. If the digital contract has entered a negotiation phase (see FIG. 4), the chatbot module 118 may initiate the negotiation module 122 and will then receive process steps, messages, communications, or questions from the negotiation module 122.

The messages/questions/prompts from the process database 110 may be directed at various aspects pertinent to drafting a collaborative digital contract. For example, the messages/questions/prompts may be directed at adding particular clauses: such as a preamble, recitals, services, ownership, exploitation rights, credit, representation and warranties, remedies, and various so-called "boilerplate" clauses. The clauses may be suggested in an order based on path and text-based logic via questions by the chatbot module 118. The path may be determined based on a database of stored contract data with clause paths that may provide a next recommended clause.

In addition, there may be contract template stylization or customization features that is offered in a process step from the process database 110. The stylization may be with respect to numbering in the contract, a visualization of the document type, and/or moving clauses, such as in a drag and drop option.

Once the prompt, question, or message is sent to the user, the chatbot module 118 may expect a response from the user. The user's response may then be received by the chatbot module 118, at step 222. The response from the user then may be processed by a natural language processing engine to extract the context of the user's response, in step 224. For example, the response from the user may be a direct answer to a question or it could be a separate command to navigate to another section of the digital contract or asking a question for clarification. Natural language processing engines are well known in the industry and could be built into the system or the system could leverage a third-party natural language processing engine 134 from various third-party networks 132.

The natural language processing engine 134 may be used to process the user's response and determine the context of the user's response, in step 226. The context of the response may then be sent back to the chatbot module 118. For example, the context of the user's response may be determined that it is a direct answer to the chatbot's earlier question, prompt, or message, or it could be determine that the user's response was a different command or question. The processed response and/or context of the user message may then be received by the chatbot module 118, at step 228. Because the chatbot module 118 is aware of the context of the user response, the chatbot module 118 may determine if the response was a direct response to the previous prompt, question, or message, or if the user is asking a question or issuing a different comment, in step 230. If the user is asking a question or asking for help, the user needs more information or education so the chatbot module 118 would poll the education database 112 for related educational materials, in step 232, and send the related educational materials to the user, in step 234.

For example, a user may not understand something in the process and ask the chatbot module 118 to explain or may ask the chatbot to define or explain a specific term. Once the requested educational material is identified it is sent to the user. The educational material from the education database 112 may be videos, links to educational materials on a website, a definition or explanation of a word, and/or an educational document or slide show. There may be any number of educational materials that could help the user through the collaborative digital contract drafting process. In addition, with definitions of specific terms extracted from the educational material or redefined differently, such definitions of terms may be tracked as well. A "definition" portion of the contract may provide such definitions of terms in the collaborative digital contract.

Alternatively, the user may issue a command, in step 236, such as "skip section" which would indicate to the chatbot module 118 to navigate to the next process step. The response from the user may then be sent to the drafting module 120. The drafting module 120 may then store the response from the user in an appropriate location of the database, in step 238, and the chatbot module 118 may receive the next step in the process, including the next prompt, question, or message, in step 240. The base module 114 may determine whether the contract drafting phase is complete, such as based on a response via the chatbot module 116, in step 242. If the drafting of the digital contract is completed, the base module 114 may initiate the recommendation module 124 to be provided recommended revisions of and suggestions for the digital draft contract, in step 244, before beginning the negotiation phase.

Figure 3A:
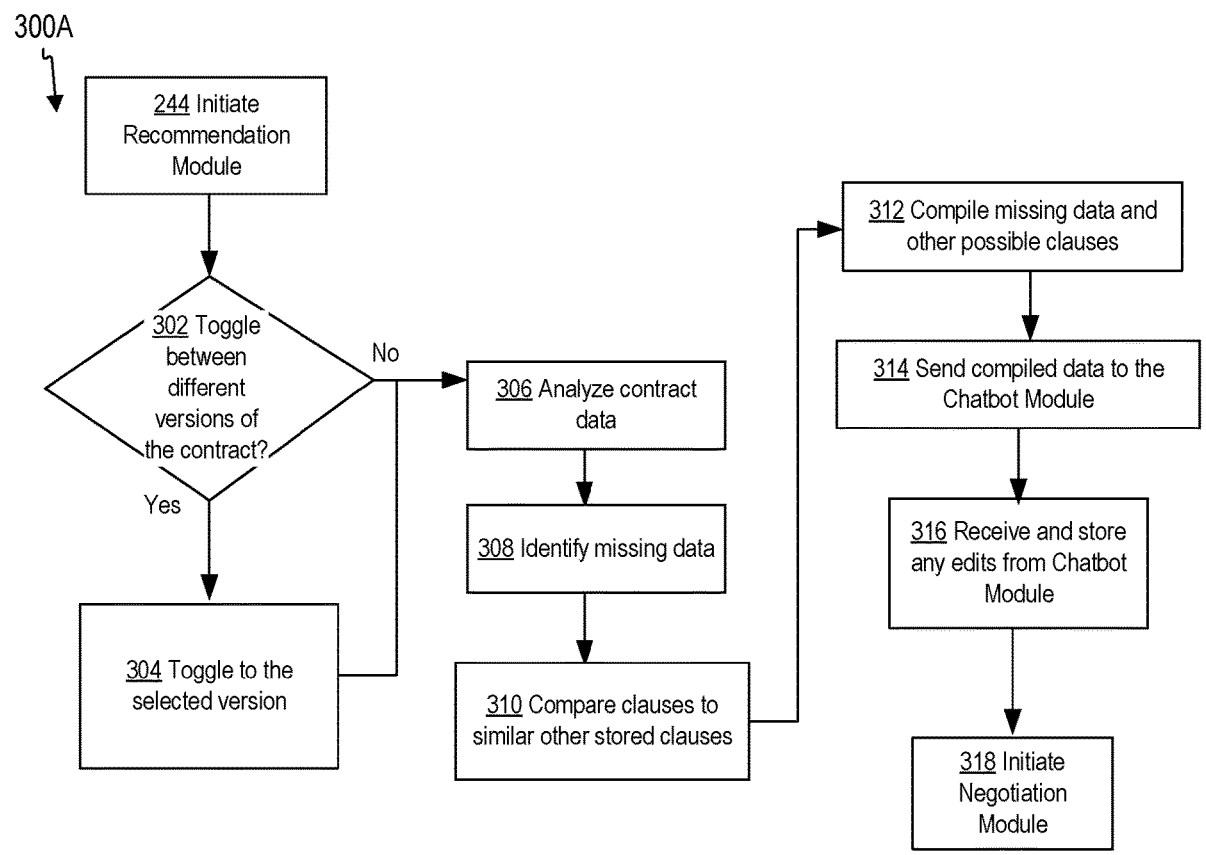
FIG. 3A illustrates an example workflow performed by a recommendation module, according to an embodiment.

FIG. 3A illustrates an example workflow 300A performed by the recommendation module 124, according to an embodiment. The example workflow 300A begins with the recommendation module 124 being initiated by the base module 114 or the chatbot module 118, at step 244, which may continue from the example workflow 200B of FIG. 2B.

Simultaneously during the drafting of the digital contract, or afterwards upon request, the recommendation module 124 may create various formats or versions of the developed digital contract that the user may decide to toggle between. For example, the digital contract may be a short-form contract that was quickly developed with basic terms decided on that the user wants to turn into a long-form contract with more recommended clauses. On the other hand, a long-form contract may be shortened into a more succinct contract with only the bare minimum presented. The recommendation module 124 may provide an option for the user to toggle between a short-form contract and a long-form contract, in step 302, and then toggle to a selected version, in step 304.

The recommendation module 124 may further analyze the digital contract data by polling the digital contract data stored in the user database 108 to ensure all aspects of the digital contract have been completed, and make suggestions or recommendations on possible changes, such as based on other user data, at step 306. For example, the recommendations module 124 further examine the draft digital contract and look for missing data, in step 308, such as by looking at specifically selected clauses and comparing them to historical data or if the same there are different clauses for similar types of contracts that are used more often by other users, in step 310. In addition, if after the draft digital contract was converted to a different form, such as from a short-form to a long-form, there may be missing data that may need to be filled in.

Furthermore, the recommendations module 124 may examine the draft digital contract and determine if other parties should be added or if additional contracts associated with the current contract should be created. For example, a user may develop a contract for a producer to help create a song recording and the recommendation module 124 may recommend forming contracts with other parties, such as a music engineer. In addition, the different versions or forms may be created simultaneously to drafting the digital contract or upon request, and may be toggled between one another. The different versions or forms may be different types of contracts covering the same parties and related terms and conditions. For example, if the drafted digital contract is a non-binding term sheet form, the toggling may convert and/or create a new separate contract for a proposal, a confirmation letter, a binding term sheet, and/or a long-form agreement.

The digital contract data is then analyzed by polling the digital contract data stored in the user database 108 to determine if there are any missing data points or missing fields, and even compares clauses to see if there are more popular clauses that might be better suited, at step 312. The analysis will determine if there is any missing data, such as missing parties that should be involved, or possibly missing fields that the user skipped early in the process and forgot to go back and fill in. The recommendation module 124 may then compare the current clauses that make up the digital contract with metrics related to how often or how popular other clauses were used by other users. The purpose behind this comparison is to identify potential clauses that might hold more weight or be more attractive for specific use cases. Other metrics could be used to determine the best clause, but how often a clause is used or its popularity is just one possible metric.

All the missing data and suggested clauses may then be compiled, in step 314, and the data may be sent to the drafting module 120 to be used as additional communications points as part of the collaborative digital contract drafting process and/or presented to the user to add missing data or alter the digital contract based on suggested clauses, at step 316. Once this is done, the drafting phase of the digital contract is completed, and the module ends. In another embodiment, the user would also have the ability to return to the digital contract using the chatbot to make changes as long as the digital contract has not been executed by all parties yet.

Once the drafting phase is complete, the next phase is the negotiation phase conducted by the negotiation module 122, in step 318. The negotiation module 122 is used to coordinate communications between parties and coordinate edits and changes between parties.

Figure 3B:
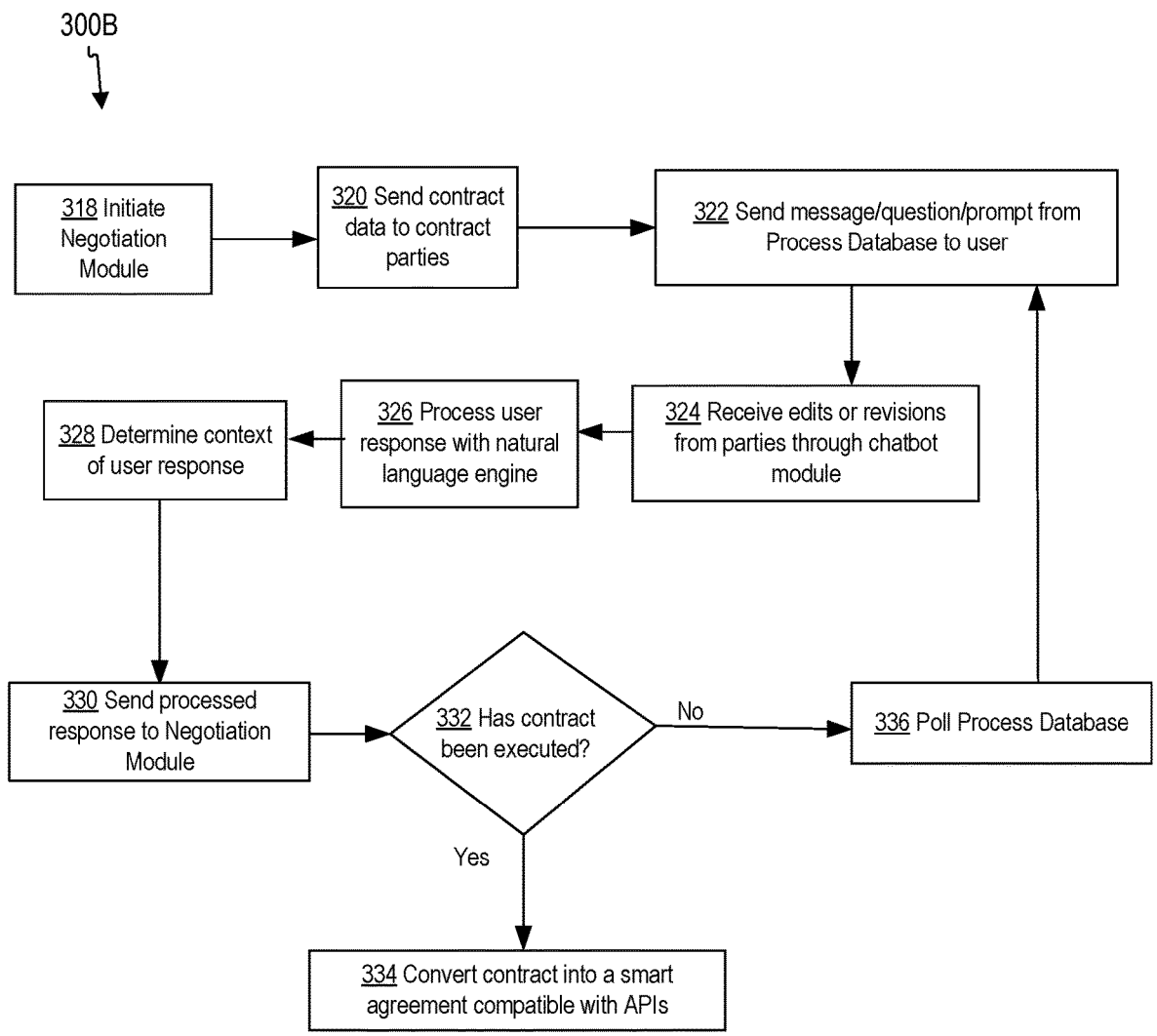
FIG. 3B illustrates an example workflow performed by a negotiation module, according to an embodiment.

FIG. 3B illustrates an example workflow 300B performed by the negotiation module 122, according to an embodiment. The example workflow 300B begins with the negotiation module 122 being initiated by the base module 114 or the chatbot module 118, at step 244, which may continue from the example workflow 300A of FIG. 3A. Once the negotiation module 122 is initiated, in step 318, the digital contract data may be sent to the negotiation module 122 so that the negotiation module 122 can extract communication data for each party and send them the digital contract to review, in step 320.

Because the negotiation module 122 has the digital contract data, including the parties involved, the negotiation module 122 can send the parties a copy of the digital contract or a link to log into the system to review and provide edits, revisions, or feedback on the digital contract. If the user or one of the parties makes revisions or edits to the digital contract, it may be received through the negotiation module 122 through the chatbot module 118. For example, a party may redline or make language changes to specific clauses. With the redlines associated with different parties, different variations or versions of the collaborative digital contract may be drafted. The digital contract data may then updated with the feedback, revisions, or edits that is received. These changes can be shared with parties as well so that everyone involved can see and review the changes and comment or make additional changes.

Because negotiations are generally an iterative process, the chatbot may be used to coordinate edits and revisions between parties. The negotiation module 122 may then send data to the chatbot module 118 which the chatbot module 118 uses to prompt, question, or message the user, in step 322. The data that is received from the negotiation module 122 may be prompts for next steps in the negotiation process or could be communications from other parties involved in the digital contract. Like the drafting process, the negotiation module 122 uses the process database 110 to determine the next step in the negotiation process.

The received response from the user may be a command for making revisions and/or directly related to the prompt, message, or question that was just sent, at step 324. The response from the user then may be processed by a natural language processing engine, in step 326, such that the context of the user's response may be extracted, in step 328. For example, the response from the user may be a direct answer to a question or it could be a separate command to navigate to another section of the digital contract or it could be the user asking a question for clarification.

Natural language processing engines are well known in the industry and could be built into the system or the system could leverage a third party natural language processing engine. The natural language processing engine would process the user's response and determine the context of the user's response. The context of the response may then sent back to the chatbot module 118. For example, the context of the user's response may be determined to be a direct answer to the chatbot's earlier question, prompt, or message, or it could be determined that the user's response was a different command or question.

The processed response may then be sent to the negotiation module 122 and the negotiation module 122 may receive the response to determine the next step in the process or where to send the communication if it is a communication, at step 330. In another embodiment as mentioned previously, the chatbot module 118 has a learning component and can learn a user's intent or next possible action using artificial intelligence. For example, the chatbot module 118 would store communications from users and use the stored communications to make connections with the platforms process and comment next steps.

The negotiation module 122 may determine whether the contract has been fully executed, in step 332. If the digital contract has been fully executed by parties, then the negotiation process is complete, and the smart agreement module 125 may convert the digital contract into a smart agreement at step 334. If the digital contract is still being negotiated, then the negotiation module 122 polls the process database 110, at step 336. Once the digital contract has been executed, the negotiation process is complete and the module ends.

Figure 4:
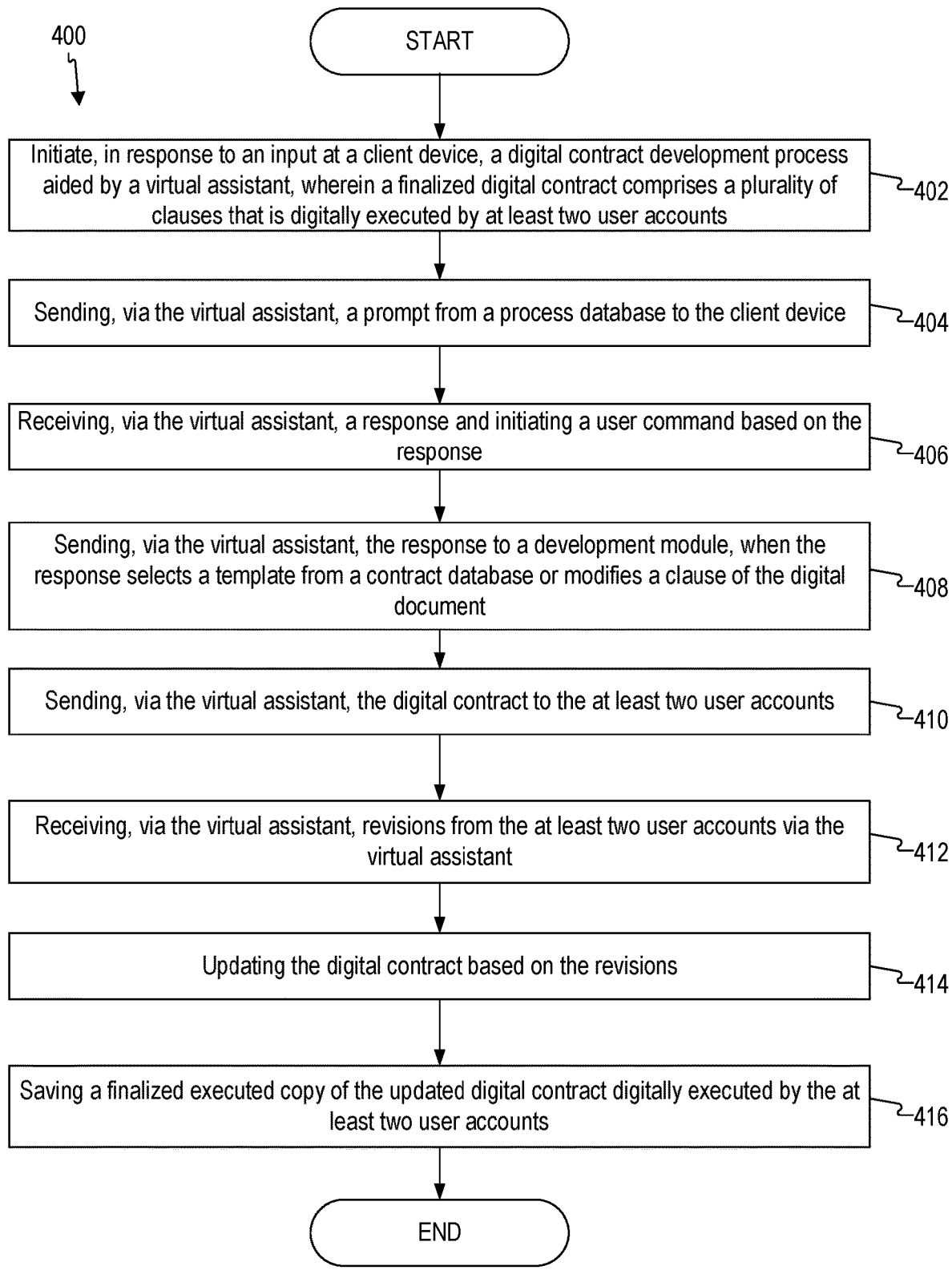
FIG. 4 illustrates an example method for providing a virtual assistant in aiding the collaborative digital contract drafting process, according to an embodiment.

FIG. 4 illustrates an example method 400 for providing a virtual assistant in aiding collaborative digital contract drafting. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes initiating, in response to an input at a client device, a collaborative digital contract drafting process aided by a virtual assistant at block 402. For example, the base module 114 illustrated in FIG. 1 may initiate, in response to an input at a client device, a collaborative digital contract drafting process aided by a virtual assistant. A finalized digital contract may comprises a plurality of clauses that is digitally executed by at least two user accounts.

According to some examples, the method includes sending, via the virtual assistant, a prompt from a process database to the client device when the collaborative digital contract drafting process is in a drafting phase at block 404.

For example, the chatbot module 118 illustrated in FIG. 1 may send, via the virtual assistant, a prompt from a process database to the client device.

According to some examples, the method includes receiving, via the virtual assistant, a response and initiating a user command based on the response at block 406. For example, the chatbot module 118 illustrated in FIG. 1 may receive, via the virtual assistant, a response and initiate a user command based on the response.

According to some examples, the method includes sending, via the virtual assistant, the response to a drafting module, when the response selects a template from a contract database or modifies a clause of the digital contract at block 408. For example, the chatbot module 118 illustrated in FIG. 1 may send, via the virtual assistant, the response to a drafting module, when the response selects a template from a contract database or modifies a clause of the digital contract.

According to some examples, the method includes sending, via the virtual assistant, the digital contract to the at least two user accounts when the drafting phase is complete and the collaborative digital contract drafting process is in a negotiation phase at block 410. For example, the chatbot module 118 illustrated in FIG. 1 may send, via the virtual assistant, the digital contract to the at least two user accounts.

According to some examples, the method includes receiving, via the virtual assistant, revisions from the at least two user accounts via the virtual assistant at block 412. For example, the chatbot module 118 illustrated in FIG. 1 may receive, via the virtual assistant, revisions from the at least two user accounts via the virtual assistant.

According to some examples, the method includes updating the digital contract based on the revisions at block 414. For example, the drafting module 120 and the user database 108 illustrated in FIG. 1 may update the digital contract based on the revisions.

According to some examples, the method includes saving a finalized executed copy of the updated digital contract digitally executed by the at least two user accounts at block 416. For example, the negotiation module 122 illustrated in FIG. 1 may save a finalized executed copy of the updated digital contract digitally executed by the at least two user accounts.

According to some examples, the method includes receiving an input to toggle between a short-form contract version and a long-form contract version of the digital contract. For example, the recommendation module 124 illustrated in FIG. 1 may receive an input to toggle between a short-form contract version and a long-form contract version of the digital contract. The toggling may also be with respect to correspondences between the parties or to third-parties, proposals, letters, etc. One of the short-form contract version and the long-form contract version is populated by a recommendation module and the other is the digital contract developed by the guidance of the virtual assistant through the collaborative digital contract drafting process. The one of the short-form contract version and the long-form contract version that is populated by a recommendation module is populated simultaneously to drafting of the other during the collaborative digital contract drafting process. During the collaborative digital contract drafting process, an option to toggle is available via the virtual assistance or at the client device.

According to some examples, the method includes converting the finalized executed copy of the digital contract into a smart agreement managed by blockchain technology for transactions covered by the agreement to be enforced whereby terms of agreement are tracked and/or carried out automatically. For example, the smart agreement module 125 illustrated in FIG. 1 may convert the finalized executed copy of the digital contract into a smart agreement managed by blockchain technology for transactions covered by the agreement to be enforced whereby terms of agreement are tracked and/or carried out automatically. According to some examples, the method includes providing one or more application program interfaces that correspond directly with properties and methods of the smart agreement. For example, the smart agreement module 125 illustrated in FIG. 1 may provide one or more application program interfaces that correspond directly with properties and methods of the smart agreement.

According to some examples, the method includes receiving, via the virtual assistant, a second response and determining the second response is a question when the collaborative digital contract drafting process is in the drafting phase. For example, the chatbot module 118 illustrated in FIG. 1 may receive, via the virtual assistant, a second response and determine the second response is a question. According to some examples, the method includes polling an education database for educational content based on the question. For example, the base module 114 and/or the chatbot module 118 illustrated in FIG. 1 may poll an education database for educational content based on the question. According to some examples, the method includes sending, via the virtual assistant, the educational content to the client device. For example, the chatbot module 118 illustrated in FIG. 1 may send, via the virtual assistant, the educational content to the client device. In some instances, education content is a definition of a contract term, and the definition is added to a definition section of the digital contract. Each digital contract may have an interactive glossary that provides definitions of terms in the digital contract with links to where they appear in the contract, According to some examples, the method includes initiating a recommendation module after the drafting phase is complete. For example, the base module 114 illustrated in FIG. 1 may initiate a recommendation module after the drafting phase is complete. According to some examples, the method includes analyzing contract data and identifying missing data. For example, the recommendation module 124 illustrated in FIG. 1 may analyze contract data and identify missing data. The missing data includes at least one of one or more missing terms, one or more missing clauses, and one or more missing complementary contracts. According to some examples, the method includes comparing one or more clauses of the plurality of clauses to related stored clauses from a clause database. For example, the recommendation module 1 illustrated in FIG. 1 may compare one or more clauses of the plurality of clauses to related stored clauses from a clause database. According to some examples, the method includes sending, via the virtual assistant, complied recommendation data to the client device. For example, the recommendation module 124 and/or the chatbot module 118 illustrated in FIG. 1 may send, via the virtual assistant, complied recommendation data to the client device.

According to some examples, the method includes extracting communication data for each user account based on the revisions when the collaborative digital contract drafting process is in the negotiation phase. In some instances, the revisions may be tracked to each user account and different versions of the digital contract are formed based on tracked changes of each user account. For example, the recommendation module 124 illustrated in FIG. 1 may extract communication data for each user account based on the revisions. According to some examples, the method includes sending, via the virtual assistant, a prompt, question, or message to each user account based on the communication data. For example, the chatbot module 118 illustrated in FIG. 1 may send, via the virtual assistant, a prompt, question, or message to each user account based on the communication data.

Figure 5:
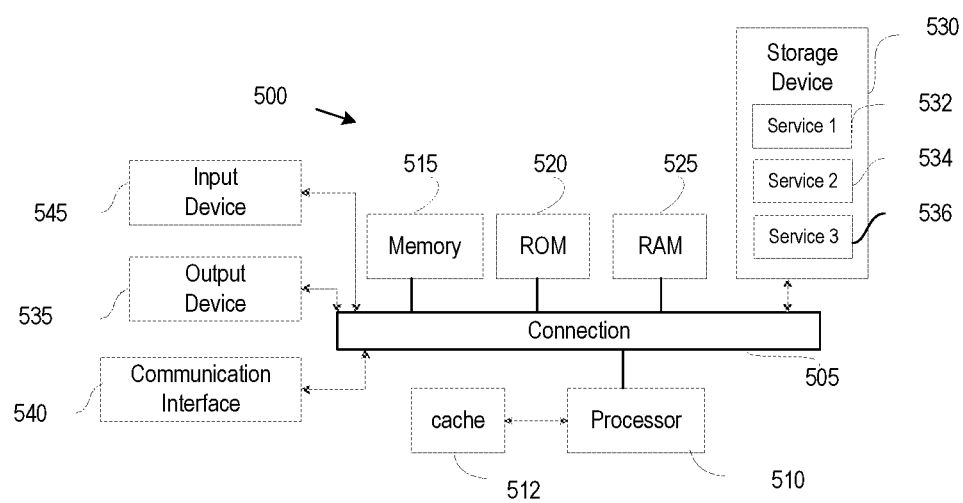
FIG. 5 illustrates an example computing system in accordance with an embodiment.

According to some examples, the method includes receiving a contract template stylization request. The method may further include causing to display a plurality of document visualization options, including a drag and drop option and modifying the digital contract to reflect a selected visualization modification. According to some examples, the method includes prompt, by the chatbot module, one or more questions in an order based on path and text-based logic to suggest a next clause. FIG. 5 shows an example of computing system 500, which can be for example any computing device making up the collaborative digital contract drafting system 102, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method of providing an interactive chatbot in aiding collaborative digital contract drafting comprising:
   initiating, in response to an input at an interactive chatbot interface at a client device, a collaborative digital contract drafting process aided by the interactive chatbot using a natural language engine, wherein a finalized digital contract comprises a plurality of clauses that is digitally executed by at least two user accounts;
   when the collaborative digital contract drafting process is in a drafting phase:
      sending, via the interactive chatbot, a prompt from a process database to the client device;
      receiving, via the interactive chatbot, a prompt response, the prompt response provided by a user in response to the prompt;
      initiating a user command based on the prompt response;
      sending, via the interactive chatbot, the prompt response to a drafting module, when the prompt response is associated with a selection of a template of a digital contract from a contract database or is associated with a modification of a clause of a saved draft of the digital contract;
   receiving, via the interactive chatbot, a question associated with the selected template or the modified draft of the digital contract;
   polling an education database for educational content based on the question; and
   sending, via the interactive chatbot, the educational content to the client device, wherein the education content is a definition of a contract term, and the definition is added to in a definition section of the digital contract; and
   when a response via the interactive chatbot is received indicating that the drafting phase is complete and the collaborative digital contract drafting process is in a negotiation phase:
      sending, via the interactive chatbot, the digital contract to the at least two user accounts;
      receiving, via the interactive chatbot, revisions from the at least two user accounts via the interactive chatbot;
      updating the digital contract based on the revisions;
      receiving a finalized executed copy of the updated digital contract, the updated digital contract digitally executed by the at least two user accounts; and
      saving the finalized executed copy of the updated digital contract.

2. The method of claim 1, further comprising:
   receiving an input to toggle from and converting a short-form contract version of the digital contract to a long-form contract version of the digital contract, a correspondence, proposal, or a letter, wherein the long-form contract version is generated by a recommendation module populating clauses determined by other inputs via the interactive chatbot and the short-form contract version is the digital contract developed by guidance of the interactive chatbot through the collaborative digital contract drafting process.

3. The method of claim 2, wherein the one of the short-form contract version and the long-form contract version that is populated by a recommendation module is populated simultaneously to drafting of the other during the collaborative digital contract drafting process, wherein during the collaborative digital contract drafting process, an option to toggle is available via the interactive chatbot or at the client device.

4. The method of claim 1, further comprising:
converting the finalized executed copy of the digital contract into a smart agreement managed by blockchain technology for transactions covered by the smart agreement to be enforced whereby terms of agreement carried out automatically; and
providing one or more application program interfaces (APIs) that correspond directly with properties and methods of the smart agreement.

5. The method of claim 1, further comprising:
initiating a recommendation module after the drafting phase is complete;
analyzing contract data and identifying missing data, wherein the missing data includes at least one of one or more missing terms, one or more missing clauses, and one or more missing complementary contracts;
comparing one or more clauses of the plurality of clauses to related stored clauses from a clause database; and
sending, via the interactive chatbot, complied recommendation data to the client device.

6. The method of claim 1, further comprising:
when the collaborative digital contract drafting process is in the negotiation phase:
extracting communication data for each user account based on the revisions, wherein the revisions are tracked to each user account and different versions of the digital contract are formed based on tracked changes of each user account; and
sending, via the interactive chatbot, a prompt, question, or message to each user account based on the communication data.

7. The method of claim 1, wherein the input to the interactive chatbot is voice-based input.

8. A system comprising:
a storage configured to store instructions; and
one or more processors configured to execute the instructions and cause the one or more processors to:
initiate, in response to an input at a client device, a collaborative digital contract drafting process aided by an interactive chatbot, wherein a finalized digital contract comprises a plurality of clauses that is digitally executed by at least two user accounts;
when the collaborative digital contract drafting process is in a drafting phase:
send, via the interactive chatbot, a prompt from a process database to the client device;
receive, via the interactive chatbot, a prompt response, the prompt response provided by a user in response to the prompt;
initiate a user command based on the prompt response;
send, via the interactive chatbot, the prompt response to a drafting module, when the prompt response is associated with a selection of a template of a digital contract from a contract database or is associated with a modification of a clause of a saved draft of the digital contract;
receive, via the interactive chatbot, a question associated with the selected template or the modified draft of the digital contract;
poll an education database for educational content based on the question; and
send, via the interactive chatbot, the educational content to the client device, wherein the educational content is a definition of a contract term, and the definition is added to in a definition section of the digital contract; and
when a response via the interactive chatbot is received indicating that the drafting phase is complete and the collaborative digital contract drafting process is in a negotiation phase:
send, via the interactive chatbot, the digital contract to the at least two user accounts;
receive, via the interactive chatbot, revisions from the at least two user accounts via the interactive chatbot;
updating the digital contract based on the revisions;
receive a finalized executed copy of the updated digital contract, the updated digital contract digitally executed by the at least two user accounts; and
save the finalized executed copy of the updated digital contract.

9. The system of claim 8, wherein the one or more processors are configured to execute the instructions and cause the one or more processors to:
receive an input to toggle from and converting a short-form contract version of the digital contract to a long-form contract version of the digital contract, a correspondence, proposal, or a letter, wherein the long-form contract version is generated by a recommendation module populating clauses determined by other inputs via the interactive chatbot and the short-form contract version is the digital contract developed by guidance of the interactive chatbot through the collaborative digital contract drafting process.

10. The system of claim 9, wherein the one of the short-form contract version and the long-form contract version that is populated by the recommendation module is populated simultaneously to drafting of the other during the collaborative digital contract drafting process and the one of the short-form contract version and the long-form contract version that is populated by a recommendation module is populated simultaneously to drafting of the other during the collaborative digital contract drafting process.

11. The system of claim 8, wherein the one or more processors are configured to execute the instructions and cause the one or more processors to:
convert the finalized executed copy of the digital contract into a smart agreement managed by blockchain technology for transactions covered by the smart agreement to be enforced whereby terms of agreement are carried out automatically; and
provide one or more application program interfaces that correspond directly with properties and methods of the smart agreement.

12. The system of claim 8, wherein the one or more processors are configured to execute the instructions and cause the one or more processors to:
initiate a recommendation module after the drafting phase is complete;
analyze contract data and identify missing data, wherein the missing data includes at least one of one or more missing terms, one or more missing clauses, and one or more missing complementary contracts;

compare one or more clauses of the plurality of clauses to related stored clauses from a clause database; and send, via the interactive chatbot, complied recommendation data to the client device.

13. The system of claim 8, wherein the one or more processors are configured to execute the instructions and cause the one or more processors to:

when the collaborative digital contract drafting process is in the negotiation phase;

extract communication data for each user account based on the revisions; and send, via the interactive chatbot, a prompt, question, or message to each user account based on the communication data.

14. A non-transitory computer readable medium comprising instructions, the instructions, when executed by a computing system, cause the computing system to:

initiate, in response to an input at a client device, a collaborative digital contract drafting process aided by an interactive chatbot, wherein a finalized digital contract comprises a plurality of clauses that is digitally executed by at least two user accounts;

when the collaborative digital contract drafting process is in a drafting phase;

send, via the interactive chatbot, a prompt from a process database to the client device;

receive, via the interactive chatbot, a prompt response, the prompt response provided by a user in response to the prompt;

initiate a user command based on the prompt response;

send, via the interactive chatbot, the prompt response a drafting module, when the prompt response is associated with a selection of a template of a digital contract from a contract database or is associated with a modification of a clause of a saved draft of the digital contract;

receive, via the interactive chatbot, a question associated with the selected template or the modified draft of the digital contract;

poll an education database for educational content based on the question; and send, via the interactive chatbot, the educational content to the client device, wherein the educational content is a definition of a contract term, and the definition is added to in a definition section of the digital contract; and when a response via the interactive chatbot is received indicating that the drafting phase is complete and the collaborative digital contract drafting process is in a negotiation phase;

send, via the interactive chatbot, the digital contract to the at least two user accounts;

receive, via the interactive chatbot, revisions from the at least two user accounts via the interactive chatbot;

update the digital contract based on the revisions; and receive a finalized executed copy of the updated digital contract, the updated digital contract digitally executed by the at least two user accounts; and save the finalized executed copy of the updated digital contract.

15. The non-transitory computer readable medium of claim 14, wherein the non-transitory computer readable medium further comprises instructions that, when executed by the computing system, cause the computing system to:

receive an input to toggle from and converting a short-form contract version of the digital contract to a long-form contract version of the digital contract, a correspondence, proposal, or a letter, wherein the long-form contract version is generated by a recommendation module populating clauses determined by other inputs via the interactive chatbot and the short-form contract version is the digital contract developed by guidance of the interactive chatbot through the collaborative digital contract drafting process.

16. The non-transitory computer readable medium of claim 15, the one of the short-form contract version and the long-form contract version that is populated by the recommendation module is populated simultaneously to drafting of the other during the collaborative digital contract drafting process and the one of the short-form contract version and the long-form contract version that is populated by the recommendation module is populated simultaneously to drafting of the other during the collaborative digital contract drafting process.

17. The non-transitory computer readable medium of claim 14, wherein the non-transitory computer readable medium further comprises instructions that, when executed by the computing system, cause the computing system to:

convert the finalized executed copy of the digital contract into a smart agreement managed by blockchain technology for transactions covered by the agreement to be enforced whereby terms of agreement are carried out automatically; and provide one or more application program interfaces that correspond directly with properties and methods of the smart agreement.

18. The non-transitory computer readable medium of claim 14, wherein the non-transitory computer readable medium further comprises instructions that, when executed by the computing system, cause the computing system to:

initiate a recommendation module after the drafting phase is complete;

analyze contract data and identify missing data, wherein the missing data includes at least one of one or more missing terms, one or more missing clauses, and one or more missing complementary contracts;

compare one or more clauses of the plurality of clauses to related stored clauses from a clause database; and send, via the interactive chatbot, complied recommendation data to the client device.

19. The non-transitory computer readable medium of claim 14, wherein the non-transitory computer readable medium further comprises instructions that, when executed by the computing system, cause the computing system to:

receive a contract template stylization request;

cause to display a plurality of document visualization options, including a drag and drop option; and modify the digital contract to reflect a selected visualization modification.

20. The non-transitory computer readable medium of claim 14, wherein the non-transitory computer readable medium further comprises instructions that, when executed by the computing system, cause the computing system to:

prompt, by the chatbot module, one or more questions in an order based on path and text-based logic to suggest a next clause.

21. A method of providing an interactive chatbot in aiding collaborative digital contract drafting comprising:

initiating, in response to an input at an interactive chatbot interface at a client device, a collaborative digital contract drafting process aided by the interactive chatbot using a natural language engine, wherein a finalized digital contract comprises a plurality of clauses that is digitally executed by at least two user accounts;

when the collaborative digital contract drafting process is in a drafting phase:
sending, via the interactive chatbot, a prompt from a process database to the client device;
receiving, via the interactive chatbot, a prompt response, the prompt response provided by a user in response to the prompt;
initiating a user command based on the prompt response;
sending, via the interactive chatbot, the prompt response to a drafting module, when the prompt response is associated with a selection of a template of a digital contract from a contract database or is associated with a modification of a clause of a saved draft of the digital contract;
receiving, via the interactive chatbot, a question associated with the selected template or the modified draft of the digital contract;
polling an education database for educational content based on the question; and
sending, via the interactive chatbot, the educational content to the client device, wherein the education content is a definition of a contract term, and the definition is added to in a definition section of the digital contract;
receiving a finalized executed copy of the digital contract, the digital contract digitally executed by the at least two user accounts; and
saving a finalized executed copy of the digital contract digitally executed by the at least two user accounts.

\* \* \* \* \*